United States Patent [19]
Pomp et al.

[11] Patent Number: 6,002,502
[45] Date of Patent: Dec. 14, 1999

[54] SWITCHABLE OPTICAL NETWORK UNIT

[75] Inventors: Steve Pomp, Wall Township; Walter Ragg, Montville, both of N.J.; John Blake, Edgewater, Md.; Carolyn Smith, Randolph, N.J.; Patricia Highley, Alexandria, Va.; John Mullally, Bethesda, Md.

[73] Assignee: Bell Atlantic Network Services, Inc., Arlington, Va.

[21] Appl. No.: 08/568,763

[22] Filed: Dec. 7, 1995

[51] Int. Cl.$^6$ .................................................. H04B 10/20
[52] U.S. Cl. ........................... 359/117; 359/125; 359/164
[58] Field of Search .................................... 359/110, 123, 359/124, 125, 132, 135, 152, 158, 115, 117, 164; 370/341

[56] References Cited

U.S. PATENT DOCUMENTS

| | | |
|---|---|---|
| 4,135,202 | 1/1979 | Cutler . |
| 4,441,180 | 4/1984 | Schüssler ................................. 359/124 |
| 4,536,703 | 8/1985 | Jablway et al. . |
| 4,630,254 | 12/1986 | Tseng . |
| 4,709,418 | 11/1987 | Fox et al. . |
| 4,751,728 | 6/1988 | Treat . |
| 4,760,442 | 7/1988 | O'Connell et al. ....................... 359/154 |
| 4,768,188 | 8/1988 | Barnhart ..................................... 370/80 |
| 4,841,560 | 6/1989 | Chan et al. . |
| 4,958,369 | 9/1990 | Tsuchida . |
| 4,959,862 | 9/1990 | Davidou et al. ............................. 370/3 |
| 4,994,909 | 2/1991 | Graves et al. . |
| 5,018,184 | 5/1991 | Abrams et al. . |
| 5,029,333 | 7/1991 | Graves et al. .......................... 370/58.1 |
| 5,054,050 | 10/1991 | Burke et al. . |
| 5,111,497 | 5/1992 | Bliven et al. . |
| 5,115,462 | 5/1992 | Kennedy et al. . |
| 5,161,152 | 11/1992 | Czerwiec et al. .......................... 370/84 |
| 5,181,106 | 1/1993 | Sutherland . |
| 5,189,673 | 2/1993 | Burton et al. . |
| 5,191,456 | 3/1993 | Sutherland et al. ...................... 359/118 |
| 5,208,803 | 5/1993 | Conforti et al. . |
| 5,210,740 | 5/1993 | Anzai et al. ............................... 370/16 |
| 5,221,983 | 6/1993 | Wagner . |
| 5,222,083 | 6/1993 | Khouri et al. . |
| 5,301,050 | 4/1994 | Czerwiec et al. ........................ 359/110 |
| 5,303,239 | 4/1994 | Aoki et al. . |
| 5,325,223 | 6/1994 | Bears . |
| 5,339,315 | 8/1994 | Maeda et al. . |
| 5,341,415 | 8/1994 | Baran . |
| 5,347,564 | 9/1994 | Davis et al. . |
| 5,349,457 | 9/1994 | Bears . |
| 5,359,646 | 10/1994 | Johnson et al. . |
| 5,377,186 | 12/1994 | Wegner et al. . |
| 5,398,129 | 3/1995 | Reimann . |
| 5,400,395 | 3/1995 | Berenato . |
| 5,402,477 | 3/1995 | McMahan et al. . |
| 5,402,483 | 3/1995 | Weinberger . |
| 5,408,525 | 4/1995 | Eldering . |
| 5,428,679 | 6/1995 | French . |
| 5,572,347 | 11/1996 | Burton et al. ............................ 359/124 |
| 5,687,014 | 11/1997 | Czerwice et al. ........................ 359/123 |
| 5,719,917 | 2/1998 | DeBalko . |

*Primary Examiner*—Rafael Bacares
*Attorney, Agent, or Firm*—McDermott, Will & Emery

[57] ABSTRACT

A switch in an optical network unit selectively couples line side ports of the line cards of the unit to individual line circuits in drop cable wiring extending to the customer premises served by the unit. The switchable optical network unit (SONU) permits rapid automated upgrades of service. For example, automatic switching of a line circuit to a line card offering an upgraded service together with automatic provisioning of the SONU to activate service through that line card provides the new upgraded service over the existing line circuit, without requiring a technician to install a new line card or manually connect the line card to the line circuit. If the drop cable to the customer premises includes a primary line circuit and an auxiliary line circuit, the line port can be switched over from the primary line circuit to the auxiliary line circuit to automatically restore service in the event of a failure of the primary line circuit. Alternatively, the SONU can automatically connect a line card for a new service to the auxiliary line circuit to provide second line service to the customer premise.

54 Claims, 5 Drawing Sheets

SWITCHABLE OPTICAL NETWORK UNIT

CROSS-REFERENCE TO RELATED APPLICATION

This application is related to concurrently filed U.S. patent application Ser. No. 08/568,762 entitled "Auxiliary Circuit Switching for Provisioning and/or Repair in Fiber-to-the-Curb Systems" now U.S. Pat. No. 5,859,895.

TECHNICAL FIELD

The present invention relates to enhancements to a fiber-to-the-curb type telephone and/or broadband network to facilitate rapid provisioning of requested new service circuits or channels and rapid replacement of damaged circuits or channels to effectuate automatic repairs. More specifically, the present invention relates to an optical network unit having a switching function to selectively connect to different drop cable circuits.

BACKGROUND ART

A variety of telecommunication services, such as telephone service and cable television service, have become virtually ubiquitous, particularly in developed countries such as the United States. A number of economic and technical factors have increased the availability of such services, and in at least some instances, have decreased the cost. As consumers become familiar with these services, the demand for new and enhanced services has increased in an almost exponential manner.

Many common telecommunication services rely on some form of wiring, such as optical fibers, coaxial cables or copper twisted wire pairs to provide the communications to actual customer premises. Installation and maintenance of such wiring presents a variety of problems. Of particular note for purposes of this invention, servicing a request for certain types of service upgrades requires installation of new wiring from network equipment to the customer premises equipment. Similarly, repair or replacement of damaged wiring from the network equipment to the customer premises equipment often requires removal of the damaged wiring and installation of new wiring. Any such installation is labor intensive and time consuming making it difficult to quickly provision new services or to restore interrupted services. Although these problems apply to other types of networks, it may be helpful to better illustrate the problems by considering a telephone network in somewhat more detail.

In a typical telephone system, customer premises wiring connects telephone station equipment to a central office switching system via a hardwired line. The line to the customer premises may take many different forms in the field, but most telephone circuit installations still utilize a twisted wire pair type loop or drop for at least the last 500 feet from some form of telephone line terminal into the customer premises. Typcially the drop cable from the telephone line terminal comprises an active twisted wire pair carrying a subscriber's telephone service signals and at least one spare pair. The drop cable may run along telephone poles and from an aerial terminal to a network interface device on the customer premises. Alternatively, the drop cable may run underground from a pedestal type terminal to the network interface device. The network interface device in turn connects the drop cable to the customer premises wiring. The customer premises equipment (CPE), e.g. telephone stations and the like, connects to the customer premises wiring.

The NID serves as the point of demarcation between the telephone company wiring and the customer premises wiring. The customer is responsible for maintaining and repairing the customer premises wiring, although some customers contract with the telephone company to service the customer premises wiring. The local telephone company is responsible for maintaining and repairing the telephone line from the central office as far as the NID on the customer premises.

When a subscriber served through the above described telephone line installation requests an upgrade in service by the addition of a second line, the telephone company must execute a complex procedure to physically install and/or connect a new line paralleling the first line. A simplified discussion of the process follows.

FIG. 6 shows the timeline for the process of provisioning and installation for a new service, such as the above described second telephone line. Time values shown in FIG. 6 are exemplary average values, and actual service order processing by a telephone company may take longer times, particularly during periods of increased demand for new services or repairs.

The process begins when a subscriber calls in to the business office of the telephone operating company. The subscriber provides relevant personal information to a service representative, and the subscriber and the service representative negotiate the details of the desired new service. In the present example, the service representative takes the order for the additional telephone line.

When the interaction with the customer is complete, the service representative issues an order for the desired service (new line) and obtains a due date for expected completion of the required provisioning and installation work. On average, the interaction between the subscriber and the representative and the issuance of the service order take 0.7 hours. During the next period, typically averaging about 72 hours, various service personnel provision the new service. For example, these personnel identify switching office resources for allocation to the new service (new line) and program the switching office to allocate those resources to this subscriber.

During the period following issuance of the service order, that order remains pending. This period ends when a technician becomes available and is dispatched to service this customer's order. On the average, approximately 72 hours after issuance of the service order, the telephone operating company dispatches one or more technicians to make connections and install equipment as needed to implement the newly ordered service. In the second telephone line example, this entails connecting up the new line. If the drop cable to the subscriber's premises includes a spare pair, that pair can serve as the new line. In this case, the technician connects the spare pair to appropriate connectors in the network terminal and connects the spare pair to customer premises wiring through the NID. If the drop cable to the subscriber's premises does not include a spare pair, then the technician(s) must actually run a new cable and connect a twisted wire pair from that cable as the new line.

At this point, the technician may run standard tests to determine if the newly installed service is operative, and then the technician closes out the service order. Typically, the installation process requires an average of 2.8 hours. After the installation, the business office contacts the customer as a follow-up, e.g. to determine if the service was installed to the customer's satisfaction. The follow-up may take an additional half hour.

As shown by FIG. 6 and the above discussion, an average installation and associated provisioning for an additional line takes a total of 76 hours from the time that the subscriber first calls in to order the new line. As noted above, this time often increases if technicians are unavailable, e.g. during times for a high demand for repair work. During this time, the subscriber is waiting impatiently for the new service. Also, during this time, the telephone operating company is not receiving any revenue that would otherwise accrue from the subscriber's use of the new service. The relatively long installation time therefore results in customer dissatisfaction and loss of income to the telephone operating company. Similar delays are incurred during installation of network equipment and/or customer premises interfaces during upgrades of services provided via existing wiring, e.g. from analog to digital service.

Similar time delays arise in restoring service through inoperative telephone line installations. FIG. 7 shows the timeline for service restoration. Again, time values shown in the drawing are exemplary average values, and actual service order processing by a telephone company may take longer times, particularly during periods of increased demand for service repairs.

The process begins when a subscriber calls in to the business office of the telephone operating company to request repair for an out of service telephone line. The subscriber provides relevant personal information to a service representative to identify the subscriber and the out of service line. A test center, such as a remote maintenance center (RMC) conducts automated tests on the facilities allocated to the subscriber. From these tests, it can be determined whether the fault is in the network or is somewhere in the outside plant, between the serving central office and the subcriber's telephone station equipment. Often, for outside plant faults, these tests can also provide an approximate location of the fault. The operator at the telephone company office then determines the approximate time to complete the repair and gives the subscriber that time as a 'commitment'.

When the interaction with the customer is complete, the service representative issues a trouble report, and that trouble report remains pending until dispatch of a repair technician. On average, the interaction between the subscriber and the representative and the issuance of the trouble report take 0.2 hours, and the report remains pending for 12.9 hours until the technician receives the restoration dispatch order through the appropriate work force administration (WFA) system.

Once dispatched, it requires an average of 4.4. hours to restore the circuit and report the repair back to the WFA system. For a line repair, the restoration work may be similar to the installation of a new second telephone line as discussed above. Assuming the problem is a fault in the active pair in the subscriber's drop cable, the technician may disconnect that pair and connect in the spare pair in place of the inoperative pair. Alternatively, the technician may need to install a new cable. After restoration, the technician may run standard tests to determine if the newly installed service is operative and then the technician closes out the service order.

After the restoration, the business office contacts the customer as a follow-up, e.g. to determine if the service was repaired to the customer's satisfaction. The follow-up may take an additional half hour.

As shown by FIG. 7 and the above discussion, an average restoration of an interrupted telephone line circuit takes a total of 18 hours from the time that the subscriber first calls in to report the service interruption. This time is an average only, and many customers experience longer actual times, e.g. during times when there is a high demand for repair work. As in the new service installation example, this time often increases if technicians are unavailable, and the subscriber is waiting impatiently. The relatively long restoration time results in customer dissatisfaction and loss of income to the telephone operating company.

A number of systems recently have been proposed for providing digitally multiplexed communications via fiber optic cables in telephone loop plant, between the central office and the customer premises equipment. Several such proposals generally address testing and maintenance issues, as shown by the examples discussed below.

U.S. Pat. No. 5,301,050 to Czerwiec et al. discloses a fiber-to-the-curb telecommunications network providing broadband and narrowband (telephone) services. A central office connects to a number of remote terminals via optical feeders. Separate FM super trunks carry frequency multiplexed video programming channels from the central office to the remote terminals. Optical links in turn connect the remote terminals to optical network units (ONU) in the subscribers' neighborhood (e.g. at the curb). Each subscriber's home connects to one of the ONU's via a twisted wire pair for voice and a coaxial cable for video. The optical network unit includes a test unit responsive to commands from a controller in the network unit to perform metallic line tests on lines extending to the subscriber premises. Test results are stored in a memory associated with the controller in the optical network unit. Upon receipt of a test request from a central test controller, the controller in the optical network unit either initiates a new test or sends data from the previous test to the central controller.

U.S. Pat. No. 5,054,050 to Burke et al. teaches testing of drop wires in a digital loop system that has optical fiber up to a distant terminal near the subscriber's premises. Beyond the terminal, wire pairs extend to the customer. A test module at the distant terminal determines the presence or absence of faults on the wires to the customer premises. The results of the test are transmitted via an optical data link to the remote terminal where the results can be accessed by a loop tester at the central office.

U.S. Pat. No. 5,018,184 to Abrams et al. a digital loop transmission system including a remote terminal having a plurality of channel units. The remote terminal includes a test unit with means for applying to the channel units appropriate terminations and detectors for the testing of the units.

FIG. 8 provides a simplified illustration of the unit providing the interface between the optical links and the electrical drop cable links, here referred to as an optical network unit (ONU), of the general type used in the above discussed fiber-to-the-curb networks. As illustrated, the ONU 801 connects to one or more fibers 811. The ONU 811 includes a number of line cards 803 providing the physical connection and electrical interface to various drop cable circuits 819. Although not separately shown, the ONU 811 includes some form of time division multiplexing/demultiplexing circuitry to provide two-way digital routing between time slots or channels on the high speed fiber link 811 and the line cards 801. The line cards and the time division multiplexing/demultiplexing circuitry are controlled by a controller 805.

In the upstream direction, the ONU 801 aggregates the digital signals from the line cards 803, converts the aggregate digital stream to optical form and transmits the optical signal over the fiber link 815. In the downstream direction, the ONU 801 converts a received optical signal from link

815 to electrical form, separates out digital signals for each service and applies those signals to the appropriate line cards 803.

The fiber in the loop systems have not specifically addressed the above noted problems related to provisioning and installation for service upgrades and/or restoration of interrupted circuits.

In an ONU of the type shown in FIG. 8, it is possible to remotely activate certain service functionalities, but this remote activation capability is very limited. To activate a new feature or service, the ONU controller 805 is programmed or provisioned to activate the relevant line card and to control the time division multiplexing/demultiplexing circuitry to provide routing to and from the line card. To activate a service in this manner, the line card must be in place in the ONU and available (not already in use). Also, the line card must provide the requested service. For example, if a customer requests a new telephone line, a telephone line card must be available in the ONU 801 serving that customer, otherwise the operating company must dispatch a technician to install the line card for the requested service. Also, the correct type of drop cable must be in place, otherwise a technician must be dispatched to install the requisite cable. For example, if a new purchaser of a home has telephone service and elects to now subscribe to video service, a video grade drop cable is required. This cable may be in place, e.g. if a previous owner subscribed to video services, but in many cases the operating company must dispatch technician(s) to install the cable from the ONU to the customer premise. No provision has been made to use any form of remote activation to restore interrupted service.

As shown by the above examples, many situations arise, even in the fiber-to-the-curb type systems having limited remote activation capability, wherein the operating company must still dispatch technicians to install and connect line cards and/or new wiring, to effect service restoration and/or service upgrades. Any such dispatch of a technician imposes time delays in providing the service to the network customer, as described above relative to FIGS. 6 and 7.

From the above discussion, it becomes clear that a need exists for a network architecture and/or procedures for rapid upgrades of wireline services and/or restoration of interrupted wireline services. A further need exists for such a network utilizing an advanced fiber-to-the-curb type network architecture.

DISCLOSURE OF THE INVENTION

It is an objective of the present invention to provide an optical fiber network unit, for use in a network using optical fiber to the curb transport, adapted to facilitate rapid, automatic upgrades of services.

It is a more specific objective of the invention to provide an optical network unit and/or a fiber to the curb network wherein an upgrade of service can be effectuated automatically, without requiring dispatch of a technician for any type of manual connection or activation procedures.

It is another objective of the present invention to provide an optical network unit, particularly for a network using optical fiber to the curb transport, adapted to facilitate rapid automatic restoration of services, particularly services interrupted due to line faults.

It is a more specific objective of the invention to provide a network wherein restoration of service interrupted by a line fault can be effectuated automatically, without requiring dispatch of a technician.

Another objective of the present invention is to permit upgrades of service provided via one line circuit without requiring a manual installation of a new line card or manual connection of the one line circuit to the new line card.

Another objective of the present invention is to permit maintenance of at least some available unused (auxiliary) circuits and automatic activation thereof in an optical network unit, without the need to provide an auxiliary line card for each auxiliary line circuit.

The present invention addresses the above stated needs and objectives by providing a drop line switching functionality in the optical network unit, spare facilities, and automatic activation of those spare facilities through the switch.

In one aspect, the present invention relates to a switchable optical network unit (SONU). The SONU includes an optical/electrical interface for coupling to at least one optical fiber. A multiplexer/demultiplexer is electrically coupled to the optical/electrical interface. The multiplexer/demultiplexer provides upstream multiplexing of signals from multiple customers into a high speed data stream. The multiplexer/demultiplexer demultiplexes a received high speed data stream into separate signals for the individual customers. The SONU also includes line cards. Each line card provides a two-way communications interface between the multiplexer/demultiplexer and one customer drop line port. Terminals on the line side of the SONU connect to customer drop lines. In accord with the present invention, the SONU includes a switch. The switch is coupled between the customer drop line ports of the line cards and the terminals. The switch provides selective connections between the customer drop line ports of the line cards and the terminals. A controller in the SONU activates the switch, e.g. in response to control signals received via the optical fiber link.

In a typical network, the SONU connects through one or more optical fibers to a central office switching system. The central office switching system preferably comprises a host digital terminal coupled to the optical fiber communication link and a telephone switch or the like coupled to the host digital terminal. The optical fiber link provides a plurality of two-way communication channels between the central office switching system and the SONU. The customer drop lines extend from the terminals on the SONU to network interface devices on the customer premises. The network interface devices in turn provide a connection of one or more line circuits in the drop lines to customer premises wiring.

The switch capability facilitates a number of automatic or remote controlled network operations.

In one such operation, the switch functionality facilitates restoration of service. In this operation, two line circuits extend from the SONU to the customer premise, a primary line and a secondary line. If service via the primary line fails or is predicted to fail, a remotely located operations control center in the network transmits a control signal to the SONU. In response to the control signal, the controller in the SONU activates the switch to disconnect the line card providing service to the customer premise from the primary line. The switch then connects that line card to the auxiliary line.

The customer's service thus is restored via the auxiliary line. The customer could manually connect their equipment or customer premises wiring to the auxiliary line, but preferably the network interface device also is switchable. Another control signal is sent to the network interface device, and in response, the network interface device automatically connects the customer premises wiring to the auxiliary circuit.

In another operation, the switch functionality of the SONU facilitates an upgrade of service on the subscriber's existing line. In this situation, one line is in service, and the switch in the SONU connects that line to a line card providing the desired type of service, e.g. analog telephone service. When the customer requests an upgrade, e.g. to an integrated services digital network (ISDN) service, the operations control center transmits a control signal to the SONU. In response, the controller in the SONU activates the switch to reconnect the subscriber's line to a second line card. The second line card is one which provides the upgraded service, e.g. ISDN.

Another type of upgrade operation facilitated by the SONU is activation of a second line to the customer premises. In this operation, a first line card is active and assigned to the customer. The drop cable extending from the SONU to the customer premise includes a primary line circuit and an auxiliary line circuit. The line card provides a first service, and the SONU couples communication signals relating to the first service for the one customer premise between an assigned channel on the fiber optic communication link and the first line card. The switch connects the line port of the first line card to the primary line circuit. When the subscriber requests the second line service, a control signal is sent to the SONU. In response, the controller in the SONU activates a second line card providing the requested new service. The controller also activates the switch to provide a new connection between the line port of the second line card and the auxiliary line circuit. Service through the primary line circuit remains unchanged.

The above described operations of the SONU provide automatic service restoration and/or automatic service upgrades of the types described, without the need for dispatch of any technicians. For example, there is no need to dispatch a technician to install new line cards or to reconnect line circuits to different line cards to provide different services. Also, for the auxiliary circuits, there is no need to install and maintain permanently connected auxiliary line card circuits.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention provides auxiliary circuits or channels, in a fiber-to-the-curb network. To add a circuit or channel to upgrade a service, or to replace an inoperative circuit, requires only an automatic activation of one or more of the auxiliary circuits. In many instances, the customer receives the new or restored service almost immediately because there is no need to dispatch a technician to install a circuit or repair a circuit. To minimize the number of auxiliary line cards in the ONU and to provide flexible connection of line cards of different types to different circuits, the present invention encompasses use of a switchable optical network unit (SONU). Specifically, the SONU includes a switch between the line cards and the drop cable circuits, and a controller in the SONU automatically activates the switch in response to control signals received via the network.

To facilitate an understanding of the invention, it may be helpful to first consider the overall context relating to the SONU. Accordingly, the following discussion first addresses the network architecture, then the structure of the SONU, then a switchable network interface device for use with the SONU.

Figure 1:
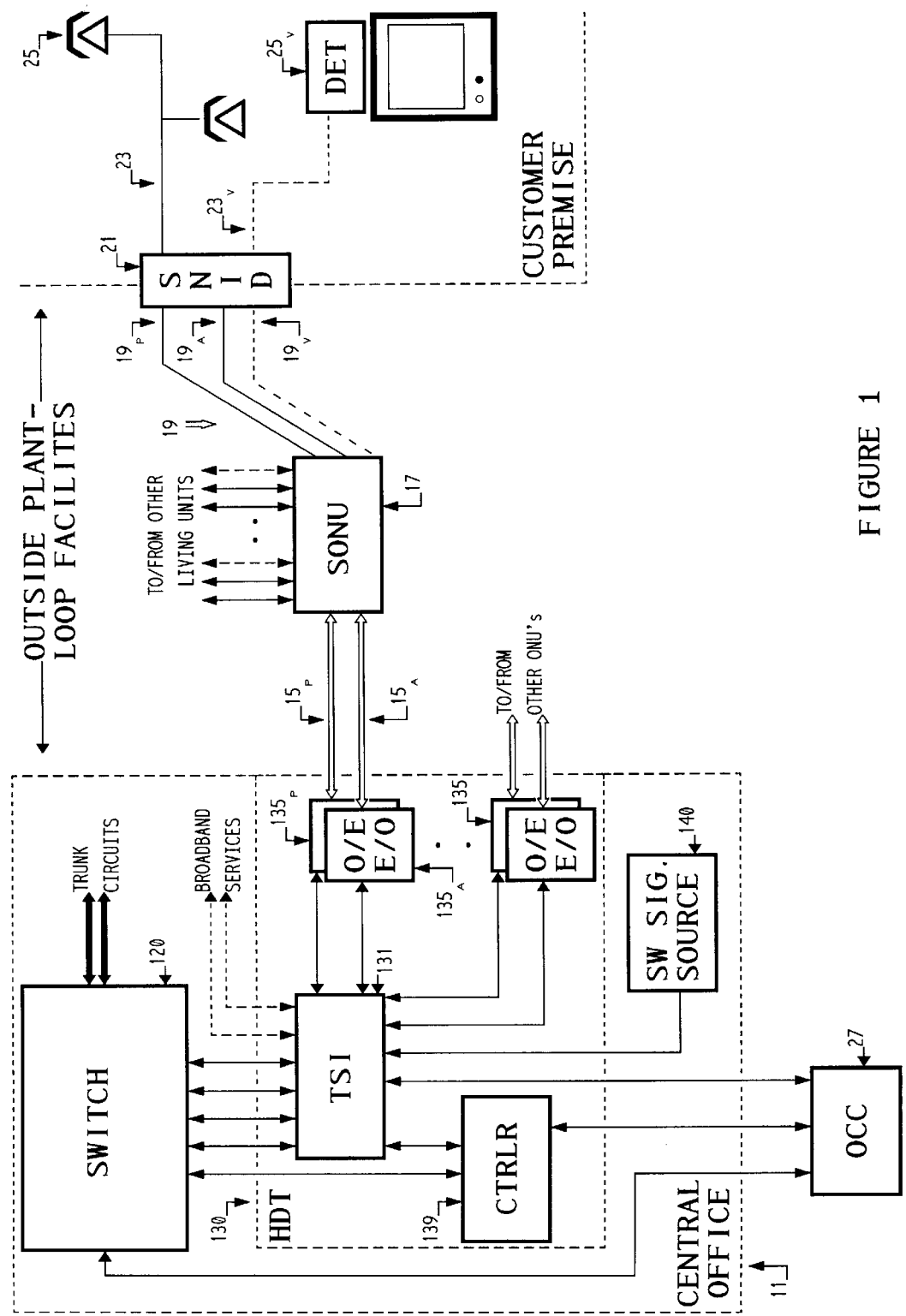
FIG. 1 is a simplified block diagram of a network in accord with the present invention.

FIG. 1 shows a simplified representation of a fiber-to-the-curb type network utilizing the concepts of the present invention. A central office switching system 11 connects through subscriber loop circuitry to customer premises. The loop circuitry for a number of subscribers served by the central office 11 includes two-way optical fiber pairs $15_P$ and $15_A$ between the central office 11 and a switched optical network unit (SONU) 17. One SONU 17 serves a number of customer premises, e.g. 32 or 48 customer premises. A set or bundle of drop cable wires 19 connects the SONU 17 to each of the customer premises (only one shown) served by the particular SONU. The SONU 17 is the interface point between optical communications on the fibers $15_P$ and $15_A$ and electrical signals on drop the cable wiring 19.

In practice, each drop cable bundle 19 will include a working circuit for each service to which the customer actively subscribes plus one auxiliary circuit. In the illustrated example, it is assumed that the customer has already subscribed to one telephone line service. The drop cable wiring 19 therefore comprises at least two twisted wire pair circuits $19_P$ and $19_A$. The twisted wire pair $19_P$ serves as the primary drop cable circuit or line for the customer's telephone service. The twisted wire pair $19_A$ serves as the auxiliary drop cable circuit or line, at least for telephone service.

As shown in dotted line form, the drop cable wiring 19 may include another active circuit $19_V$, if the customer subscribes to a broadband or video type service through the network. The wiring for drop cable $19_V$ may utilize twisted wire pair technology or that cable may comprise a coaxial cable, depending on the video transport technology used in the network.

The subscriber drop wiring 19 connects the SONU 17 to a switchable network interface device (SNID) located at the customer premises. The SNID 19 is mounted at a convenient, accessible location on the customer premise, for example on the outside of the house for a single family residence. The SNID serves as the demarcation point between the public network elements and the customer premises wiring. The switchable functionality of the SNID selectively couples various circuits or lines in the drop cable bundles 19 to the appropriate customer premises wiring. In the illustrated example, the SNID 19 provides a normal connection from the drop wiring 19 to twisted wire pair type subscriber premises wiring 23. The subscriber premises wiring 23 in turn connects to customer premises telephone equipment, shown for example as telephone stations 25. If the primary circuit $19_P$ carrying telephone service fails or is predicted to fail, the SNID 21 is automatically activated to connect the auxiliary drop cable wiring circuit $19_A$ to the customer premises wiring 23. If the subscriber orders a new telephone line, the SNID 23 is automatically activated to connect the auxiliary drop cable wiring circuit $19_A$ to an additional customer side port for coupling to additional customer premises wiring (see FIG. 3).

If the network offers video services, and the customer subscribes to such services, the SNID 19 also provides a connection of the video drop cable wiring $19_V$ through corresponding customer premises video wiring $23_V$ to one or more video terminal devices, shown as a digital entertainment terminal (DET) $25_V$ and an associated television set. The customer premises video wiring $23_V$ will comprise a twisted wire pair or a coaxial cable, depending on the network transport technology and the wiring used for the video circuit $19_V$ in the drop cable 19. The SNID may also provide selective connection of the broadband customer premises wiring $23_V$ to an auxiliary drop cable wiring circuit, e.g. to the circuit $19_A$ or to a separate auxiliary broadband circuit (not separately shown).

In the preferred network illustrated in FIG. 1, the central office 11 includes a switch 120, a host digital terminal (HDT) 130 and a switching signal source 140.

The switch 120 preferably is a program controlled central office type telephone switching system. By way of an example, the end office switch 11 may be a 5ESS switching system sold by American Telephone and Telegraph or a Northern Telecom DMS-100. Although not shown, the telephone switch 120 may connect through other types of subscriber loop systems, e.g. through single twisted wire pair type analog loops to customer premises served through older installations. The switch 120 also connects through trunk circuits and through interoffice signaling circuits (not shown) to other telephone network switching systems. The switch 120 provides switched voice grade connections for telephone services, in the normal manner.

A number of different types of host digital terminals (HDTs) are known. In the simplified form shown, the HDT 130 comprises a duplex time slot interchanger (TSI) 131, optical/electrical interface units 135 and a controller 139. The controller 139 preferably is implemented as a programmable computer, i.e. a processor with associated programming memory and data storage memory.

The TSI 131 connects to the switch 120 through standard two-way digital links, e.g. T1 circuits. The TSI 131 is a time division multiplexer/demultiplexer. The TSI 131 functions as a digital time division switching unit, providing two way switching of packets between the digital links to the switch 120 and the optical/electrical interface units 135. The routing functionality of the TSI 131 is controlled as a software function, i.e. by control signals from controller 139 which effectively assign time slots to establish virtual connections. Typically, the controller 139 stores provisioning data defining the virtual circuits.

The optical/electrical interface units 135 provide two-way conversion between electrical digital signals utilized by the TSI 131 and optical signals transported on the fibers 15. As such, each optical/electrical interface unit 135 includes at least an electrical to optical converter (E/O) for downstream transmission and an optical to electrical converter (O/E) for upstream reception. In the preferred embodiment, two optical fiber pairs $15_P$ and $15_A$ connect the HDT 130 to each SONU 17. Within the HDT 130, each optical fiber connects to one of the optical/electrical interface units 135. As illustrated, the optical fiber $15_P$ connects to an optical/electrical interface unit $135_P$, and the optical fiber $15_A$ connects to an optical/electrical interface unit $135_A$.

The TSI 131 may also connect to equipment not shown for providing broadband services. If so, the TSI provides upstream switching of signaling packets received via the optical/electrical interface units 135 to signaling data links going the broadband service provider equipment. In the other direction, the TSI 131 switches packetized broadband information for selected programming to appropriate time slots in the signal stream going through the optical/electrical interface units 135 to each respective SONU 17.

In an initial implementation, the SONU 17 will serve from four to thirty-two living units or customer premises, although larger implementations of the SONU are contemplated. The SONU 17 may be located at any convenient place in the neighborhood, for example on a telephone pole or in a telephone service pedestal. In an apartment complex, the SONU could be rack or wall mounted in a room or closet designated for communications network equipment.

The SONU 17 may receive power from the central office, via 22 gauge wire pair type cabling or through a coaxial cable. Alternatively, the SONU 17 may receive power from power company main circuits.

Each SONU 17 connects to the HDT 130 via two pairs of optical fibers $15_P$ and $15_A$. Each pair 15 comprises a downstream fiber and an upstream fiber. When active, the downstream fiber carries a packetized high-bandwidth digital signal stream from one of the optical/electrical interface units 135 to the SONU 17. The upstream fiber of the active pair carries a packetized high-bandwidth digital signal stream from one of the SONUs 17 to the optical/electrical interface unit 135. For telephone service, for example, the active pair will carry two-way digital streams for a number of DS1 channels. Each DS1, in turn, provides 24 DSO slots for 24 simultaneous voice grade telephone links. For broadband services, the downstream fiber will carry a number of higher rate data streams, and the upstream fiber will carry one or more data streams used for signaling purposes.

In the downstream direction, the SONU 17 performs optical to electrical conversion, separates out the digital signals received over the downstream optical fiber in the active pair 15. For plain old telephone service (POTS), the SONU 17 converts the digital signals to analog signals and supplies those signals to the appropriate twisted wire pair. For broadband services, the SONU 17 supplies the relevant digital packets directly to the broadband wiring $19_V$ for the particular subscriber. In the upstream direction, the SONU 17 performs any necessary analog to digital conversions (e.g. for POTS), aggregates the various upstream signals, performs electrical to optical conversion and transmits the optical signal over the upstream fiber of the active optical pair 15 to the HDT 130.

A key feature of the present invention is that each line or cable in the outside plant loop facilities between the central office 11 and the SNID 21 at the customer premises comprises at least one auxiliary circuit or channel. As noted above, the optical fiber link to the SONU comprises two pairs of optical fibers $15_P$ and $15_A$. If the primary pair $15_P$ fails or is predicted to fail, communications between the HDT 130 and the SONU 17 are automatically transferred to the auxiliary pair $15_A$. Similarly, the drop cable 19 includes at least one spare or auxiliary circuit $19_A$. If the subscriber orders an additional telephone line, for example, then the new service can be activated immediately through the auxiliary circuit $19_A$ by switching in the SONU 17 and in the SNID 21. Alternatively, if the primary twisted wire pair $19_P$ fails or is predicted to fail, communications between the SONU 17 and the SNID 21 are automatically switched to the auxiliary pair $19_A$.

The HDT 130 also connects to the switching signal source 140. The switching signal source 140 generates signals which trigger activation of auxiliary circuits and/or switching of services between primary circuits and secondary or auxiliary circuits. For example, the switching signal source 140 generates tone code signals. In response to appropriate instructions, the TSI 131 and the SONU 17 route such tone code signals through to an identified SNID 21 over a viable one of the circuits in the drop cable 19. In response, the SNID 21 may activate the auxiliary circuit $19_A$ to provide a second telephone line type service to secondary customer premises wiring (not shown in FIG. 1). As another example, the SNID 21 may connect the auxiliary circuit $19_A$ to the customer premises telephone wiring 23, as a replacement for the primary circuit $19_P$. e.g. because the primary circuit has failed or is predicted to fail.

The network includes an operations control center (OCC) 27. The OCC 27 is a computer center staffed by operations personnel of the network operating company. The OCC 27 communicates with a number of central offices similar to the office 11. FIG. 1 shows the logical communication links between the OCC 17 and the elements of the central office 11. In a preferred implementation, the OCC 27 is centrally located and communicates with the central offices via a packet switched data network (not shown), such as an X.25 network.

The TSI 131 provides two-way packet switching between the OCC 27 and the optical fiber links 15 to the SONUs. The switching functionality of the TSI 131 provides two-way transport of signaling data at least between the OCC 27 and the SONUs 17. As discussed more later, the SONUs 17 include test equipment. The signaling capability between the OCC and the SONUs permits operations personnel to determine the operability of the fiber links and conduct at least some tests on the subscriber drop cables 19. This signaling also facilitates automatic activation of communications through the SONU for the primary and auxiliary drop cable circuits.

In the preferred embodiment, discussed below with regard to FIG. 3, the SNID 21 also includes a test device. The SNID 21 receives instructions from the OCC 27 to conduct certain test measurements on the drop cable 19 and on the customer premises wiring 23. The SNID 21 transmits signaling data upstream through the network to the OCC 21 reporting various test results. In the preferred network embodiment, the switching functionality of the TSI 171 therefore also provides two-way transport of signaling data between the OCC 27 and the SNIDs.

The HDT 130 also includes a controller 139. The controller 139 comprises a programmed computer system, i.e. a processor with associated programming memory and data storage memory. The controller 139 controls the operations of the HDT 130, most notably including the routing functionality of the TSI 131. The controller 131 connects to the switch 120 for signaling communications, e.g. for processing of interoffice call set-up. The controller 139 also communicates with the OCC 27, to report conditions of the HDT 130 and to receive instructions to set up signaling links. The signaling links for example include links between the OCC 27 and selected SONUs 17, links between the OCC 27 and specified SNIDs 21, and links between the switching signal source 140 and specified SNIDs 21.

The OCC 27 communicates with the administrative control processor of the switch 120. The processor of the switch reports on the status of the switch 120, and the OCC 27 provides provisioning data and instructions to the switch processor, e.g. to activate new services or features for a particular subscriber.

'Reactive maintenance' relates to maintenance operations initiated in response to a report of a trouble or failure in the network, for example a report by a subscriber that the subscriber's telephone line is out of service. 'Proactive maintenance' relates to maintenance operations initiated in response to a prediction of a trouble or failure in the network prior to the actual event, for example a prediction that a particular fiber optic link is about to fail. The present invention at least provides for activation of various auxiliary circuits and/or line card connections in a reactive manner. Preferably, the OCC 27 accumulates operations data and runs a prediction program to permit activation of the auxiliary circuits and line card connections as a proactive maintenance function.

As noted above, the SONUs and SNIDs include test devices and communicate with the OCC 27. Using this functionality, the OCC 27 may detect some failures. Also, a computer processor within the OCC 27 runs the prediction routine, processing measurement data and other data from the network (e.g. traffic data) to predict impending failures. In response to a reported failure, a detected failure, or a predicted failure in a subscriber drop circuit, the OCC 27 signals an SONU and/or a SNID to switch to the appropriate auxiliary circuit. Similarly, in response to a reported failure, a detected failure, or a predicted failure, in the fiber link to an SONU, the OCC 27 signals the HDT and the SONU to activate the appropriate auxiliary fiber link.

The signaling communications between the OCC 27 and the SONUs and SNIDs also permit automatic activation of auxiliary fiber links, different line cards and/or auxiliary circuits in the drop cables 19, to provide customers requested new communications services as will be discussed in more detail below.

Figure 2:
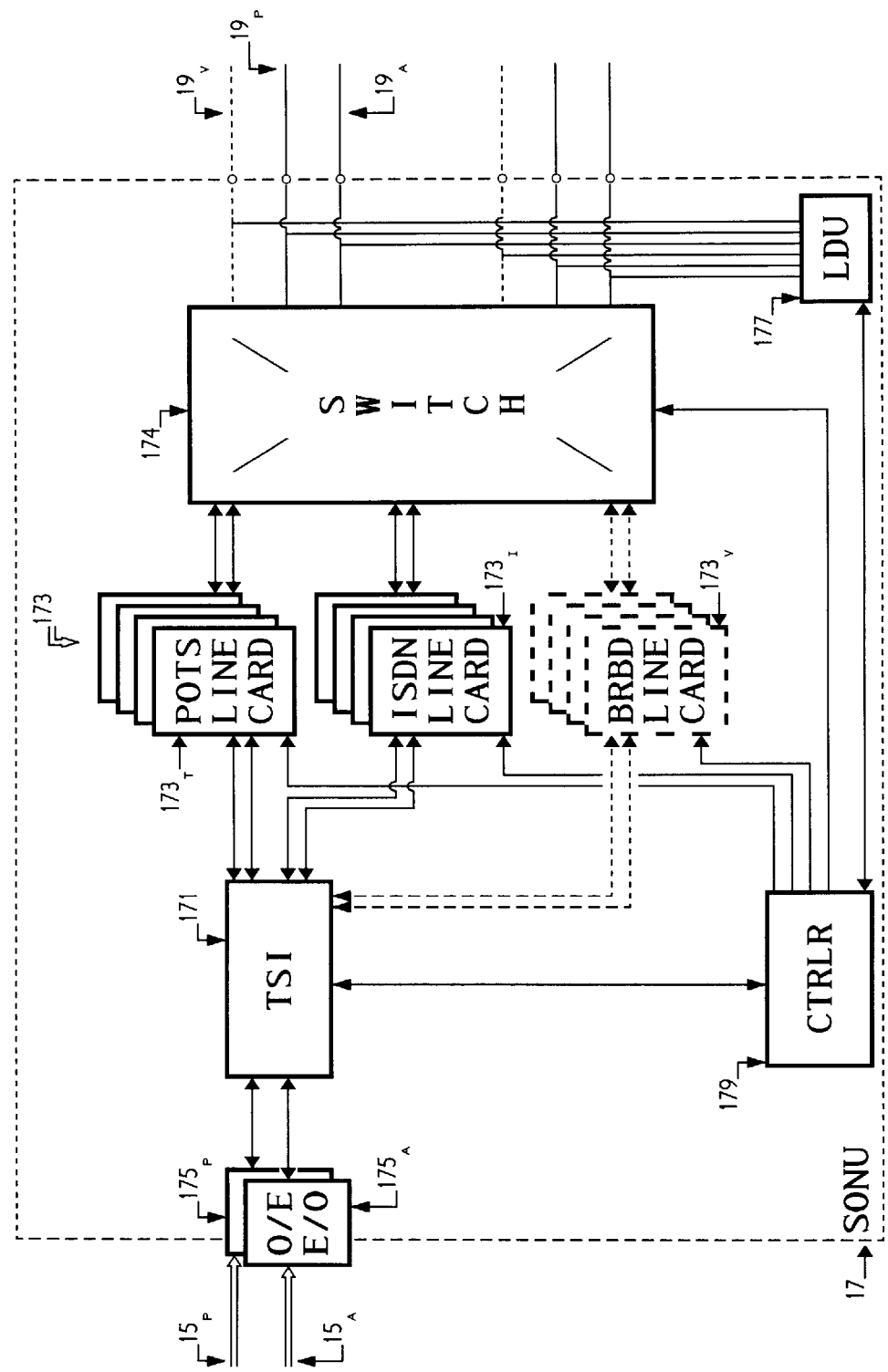
FIG. 2 is a simplified block diagram of a switchable optical network unit (SONU) for use in the network of FIG. 1.

A number of different types of ONUs are know, such as those shown in the above cited Czerwiec et al. Patent, and the principles of the present invention may be adapted to such ONUs to convert them to SONUs. FIG. 2 shows a first preferred embodiment of the SONU 17 for use in the network of FIG. 1. In the simplified form shown, the SONU 17 comprises a duplex time slot interchanger (TSI) 171, a primary optical/electrical interface unit $175_P$, an auxiliary optical/electrical interface unit $175_A$, line cards 173 and a controller 179. The controller 179 preferably is implemented as a programmable computer, i.e. a processor or microprocessor with associated programming memory and data storage memory.

The optical/electrical interface units $175_P$ and $175_A$ provide two-way conversion between electrical digital signals utilized by the TSI 171 and optical signals transported on the fibers $15_P$ and $15_A$ which connect the SONU 17 to the HDT 130. As such, each optical/electrical interface unit 175 includes at least an electrical to optical converter (E/O) for upstream transmission and an optical to electrical converter (O/E) for downstream reception.

The TSI 131 is a time division multiplexer/demultiplexer. The TSI 131 functions as a digital time division switching unit, similar to the TSI 171 discussed above, but processing a smaller number of signals for services of a smaller number of subscribers (i.e. for only the limited number of subscribers served through the one SONU). In the downstream direction, the TSI 171 receives high-rate digitally time division multiplexed signals from the active downstream fiber via one of the optical/electrical interface units $175_P$ and $175_A$. In response to signals from the controller 179, the TSI 171 routes packets from specific time slots in the received stream to selected output ports of the TSI 171, i.e. going to one of the line cards 173 or going to the controller 179. In the upstream direction, the TSI 171 aggregates various upstream signals on input ports form the line cards 173 or from the controller 179. More specifically, the TSI 171 packetizes digital signals on those input ports and digitally time division multiplexes all resultant packets into a high rate stream, and supplies that stream to the upstream input port of the active one of the optical/electrical interface units $175_P$ and $175_A$ for transmission over the active upstream fiber to the HDT 130.

The routing functionality of the TSI 171 is software controlled by provisioning data downloaded through the network and stored in the controller 179. The TSI 171 routes by providing two-way time slot assigned coupling between the optical/electrical interface units 175 and the line cards 173. Based on the provisioning data, the controller 179 instructs the TSI 171 to assign time slots to establish virtual circuits to and from the active ones of the line cards 173.

A significant feature of the SONU 17 is that the SONU 17 includes a switch 174. The switch 174 provides selective connections between customer drop line ports of the line cards 173 and wireline terminals or connectors coupled to the various drop cable circuits 19, in response to instructions from the SONU controller 179. The controller 179 activates the line cards 173 and the switch 174 in response to signaling instructions from the OCC 27.

The line cards 173 provide the interface and signal conversion functionality between the ports of the TSI 171 and the actual wiring 19 going to the respective customer premises. In the SONU 17, the line cards 173 offer different types of services and are logically categorized based on service type. Telephone service line cards may provide any type of telephone service compatible with the particular type of drop cable wiring $19_P$ and $19_A$. For example, for twisted wire pair type drop cable wiring, different types of telephone line cards could provide POTS type analog service, these line cards could provide integrated services digital network (ISDN) type service, these line cards could provide T1 type service, etc. In the illustrated example, telephone services can be provided through POTS line cards $173_T$ or through ISDN line cards $173_I$, depending on the type of service that each subscriber orders.

The number of POTS line cards $173_T$ and the number of ISDN line cards $173_I$ in the SONU 17 is a function of traffic engineering and projections for expected take rates for the various services. Typically, the SONU 17 includes one POTS line card $173_T$ per four living units or customer premises serviced by the SONU plus some number for projected second line usage. The SONU 17 includes enough ISDN line cards $173_I$ to cover current subscriptions plus expected ISDN growth in the particular neighborhood.

For an analog type telephone line (POTS), one of the line cards $173_T$ provides two-way conversion between analog and digital signals. The POTS line card also provides normal telephone line functions, such as battery feed, over-voltage protection, ringing, signaling, coding, hybrid and testing (commonly collectively identified as the 'BORSCHT' functions in the telephone industry).

The hybrid functionality of the POTS line card $173_T$ performs a two wire to four wire type conversion. The POTS line card sends and receives analog signals over a twisted wire pair, and the POTS line card sends and receives digital signals via two separate ports connected to the TSI 171. In the upstream direction, one of the POTS line cards receives analog signals from the associated twisted wire pair. The line card converts those signals into digital signals in a format compatible with the processing of the TSI 171. The POTS line card $173_T$ supplies the digitized information signals to an upstream port of the TSI 171. The TSI 171, in turn, inserts packets of the digitized information signals into assigned slots in the upstream high-rate transport stream and supplies the transport stream to the active one of the optical/electrical interface units $175_P$ and $175_A$ for transmission over the active upstream fiber to the HDT 130. In the downstream direction, the TSI 171 separates out packets from slots assigned to the particular POTS line card $173_T$ and supplies digitized information signals from those slots to a downstream port of that line card. The POTS line card $173_T$ in turn converts the downstream digitized information signals to analog form and couples the resultant analog signals to the twisted wire pair for two-wire transport to the customer premise.

The ISDN line cards $173_I$ perform similar functions to those described above for the POTS telephone line cards $173_T$ except that the signals provided on the relevant customer drop line port of the ISDN line cards $173_T$ conform to ISDN standards. For example, each of the ISDN line cards $173_I$ provides two-way signal format conversions between the formats used by the TSI 171 and digital signals on an ISDN subscriber loop. The ISDN line cards $173_I$ also perform a two-way time slot routing functionality between the B and D channels on the single twisted wire pair ISDN loop circuit and the ports connected to the TSI 171.

For a broadband service, a line card $173_V$ would include the elements necessary to communicate signaling information and broadband information over the particular broadband line $19_V$. For example, if the broadband line $19_V$ is a twisted wire pair of a relatively short length, the line card $173_V$ might provide protocol conversion between the coding utilized through the TSI 171 to a 51 Mb/s digital transport protocol (e.g. STS-1). Similarly, if the broadband line $19_V$ is a twisted wire pair of a longer length, the line card $173_V$ might provide an asymmetrical digital subscriber line (ADSL) type communication over the line $19_V$. Alternatively, the line card $173_V$ could provide digital broadband communications over coaxial cable, using any of several known digital signal formats.

The SONU 17 also preferably includes a line diagnostic unit (LDU) 177. An LDU is an automated test instrument, of a type commonly used in the telephone industry today. The LDU 177 connects to at least each telephone line circuit $19_P$, $19_A$ and preferably to each braodband line circuit $19_V$. In response to instructions from the controller 179, the LDU 177 conducts one or more test measurements on an identified one of the line circuits and supplies test results to the controller 179. The controller 179 in turn formulates appropriate messages and supplies those message to the TSI 171. The TSI 171 places the test messages in time slots assigned for signaling information from the controller 179 in the upstream high-rate digital transport stream and supplies that stream to the active one of the optical/electrical interface units $175_P$ and $175_A$ for transmission over the active upstream fiber to the HDT 130. The HDT 130 routes these messages to the OCC 27 for processing.

The OCC 27 also sends instructions to the controller 179. The HDT 130 places such instructions in time slots assigned to signaling intended for the controller 179 in the downstream high-rate transport stream on the downstream fiber of the active one of the optical fiber $15_P$ and $15_A$. In the SONU 17, the active one of the optical/electrical interface units $175_P$ and $175_A$ supplies the downstream signals to the TSI 171 for processing. The TSI 171 supplies data from downstream time slots assigned for signaling to the controller 179. These messages, for example, may instruct the controller 179 to activate the LDU 177 to conduct certain test measurements on specified line circuits, to activate a specified line card, to deactivate a specified line card, to activate the switch, etc.

In operation, many customers will have only one active line for telephone services. As such only one of the POTS line cards $173_T$ is active and coupled through the switch 174 to that subscriber's drop cable 19. Normally, the switch 174 connects the assigned POTS line card $173_T$, to the primary drop cable pair $19_P$. Provisioning information stored in the controller is used to instruct the TSI 171 to route packets to and from the assigned POTS line card $173_T$. In accord with the present invention, a variety of different circumstances arise when it becomes necessary to activate and deactivate communication via different ones of the line cards 173 and/or the telephone circuits $19_P$ and $19_A$ and to control the switch 174 accordingly.

For example, the customer may request an additional telephone line. To activate the additional line, the OCC 27 supplies instructions and provisioning data to the controller 179. If the second line is to be a POTS line, the instructions identify an available POTS line card $173_T$ and cause the controller 179 to activate that line card. The provisioning data, which the controller 179 stores in memory, provides various information that the controller needs to route signals to and from the relevant line card, e.g. to control the TSI to provide routing and associated multiplexing and demultiplexing of digital signals coming from and going to the second POTS line card. The OCC 27 also instructs the controller 179 to activate the switch 174 to connect the newly assigned POTS line card $173_T$ to the auxiliary drop cable wiring circuit $19_A$. As discussed below, the network also activates the SNID 21 to provide the proper connection to the auxiliary circuit $19_A$ on the customer premise.

If the primary circuit $19_P$ failed or was predicted to fail, the OCC 27 instructs the controller 179 to activate the switch 174. More specifically, the controller 179 activates the switch 174 to disconnect the primary circuit $19_P$ and connect the line card $173_T$ to the auxiliary circuit $19_A$, in a manner similar to that discussed above for the second line activation. The network also instructs the SNID to connect the customer premises telephone wiring 23 to the auxiliary circuit $19_A$.

Assume for discussion that a customer premises connects to drop wiring circuits $19_P$, $19_A$ and $19_V$, and the primary telephone service is an analog POTS telephone service, as discussed above. In this condition, one of the POTS line cards $173_T$ is active and assigned to the subscriber. The provisioning data for the customer's telephone service, stored in the controller 179, permits control of the TSI 171 to route digitized communication signals relating to calls on the circuit $19_P$ to and from the assigned POTS line card $173_T$. Under instructions from the OCC 27, the controller 179 also maintains the switch 174 in a state providing a connection between the assigned POTS line card $173_T$ and the primary drop cable wiring circuit $19_P$.

In our example, assume now that the customer orders an upgrade of telephone service to ISDN service. After a service representative at the business office takes the request for ISDN service, the representative forwards a service order to the OCC 27. The OCC 27 executes an automatic routine to convert the subscriber's telephone service from POTS to ISDN. More specifically, the OCC 27 sends signaling messages to the controller 179 in the SONU 17. These signaling message instruct the controller to deactivate the assigned POTS line card $173_T$ and to activate an ISDN line card $173_I$ and assign that ISDN line card to the subscriber. These signaling messages also provide provisioning data to subsequently route digitized communication signals relating to calls on the circuit $19_P$ to and from the assigned ISDN line card $173_I$. The signaling messages also instruct the OCC 27 to activate the switch 174 to a new state. In the new state, the switch 174 connects to two-wire customer line port of the assigned ISDN line card $173_I$ to the primary drop cable wiring circuit $19_P$ of the particular subscriber.

Each time that the subscriber orders a new service or an upgrade in service or there is a need for restoration of service, the switchable SONU 17 connects the appropriate line card to the relevant drop cable wiring circuit.

The use of an auxiliary fiber $15_A$ also provides redundancy. If the primary fiber $15_P$ fails, the controller 139 attempts to activate communication through the auxiliary optical/electrical interface unit $135_A$ and the auxiliary fiber pair $15_A$, and the controller 179 attempts activate communication through the auxiliary optical/electrical interface unit $175_A$ and the auxiliary fiber pair $15_A$. The OCC 27 may also provide instructions to the controllers 139, 179 to activate the auxiliary fiber link, e.g. in parallel to the primary link to provide increased transport capacity or as a replacement for a primary link that the OCC has predicted will fail.

Figure 3:
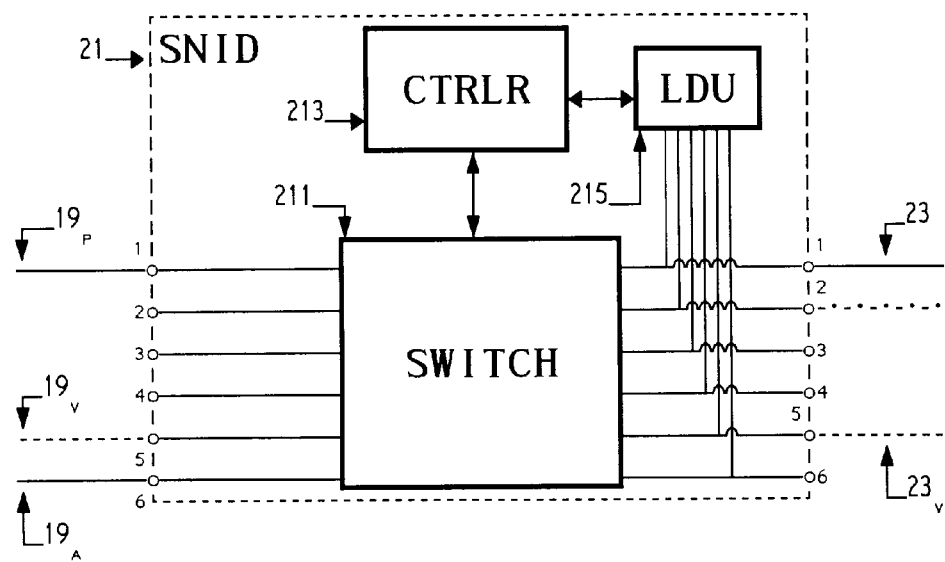
FIG. 3 is a simplified block diagram of a switchable network interface unit (SNID) for use in the network of FIG. 1.
Figure 8:
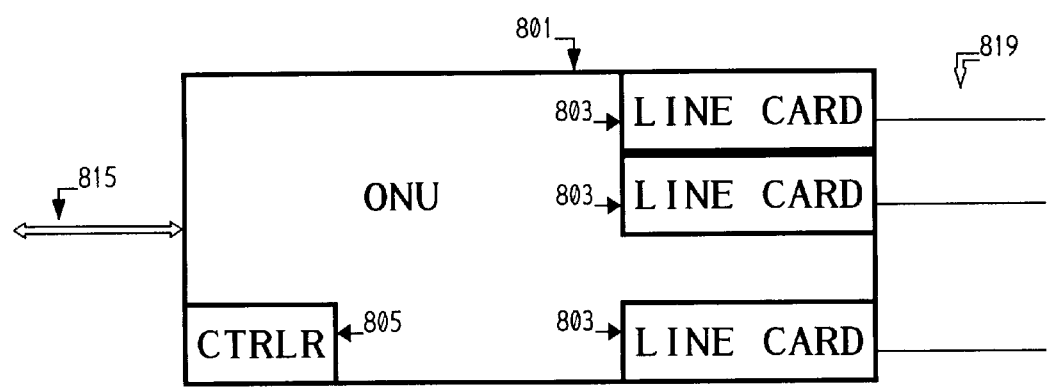
FIG. 8 is a simplified illustration of a prior art optical network unit (ONU).

FIG. 3 provides a block diagram representation of the switchable network interface device (SNID) 21. The SNID serves as the point of demarcation between the elements of the public network and the customer premises wiring and equipment. The SNID 21 includes a switch 211, and controller 213 and a line diagnostic unit (LDU) 215. At least for the telephone circuits, the SNID will include additional circuitry (not shown) for interfacing the drop cable wiring to the customer premises wiring, as is standard in NIDs used in existing telephone networks.

The switch 211 has six network side ports coupled to network side terminals or connectors on the SNID housing. The network side connectors or terminals form a network side coupler for connection of the drop cable wiring bundle 19. In an installation having a primary telephone drop circuit and an auxiliary telephone crop circuit, the primary telephone drop wiring $19_P$ preferably connects to the number 1 terminal on the network side, and the auxiliary telephone drop wiring $19_A$ preferably connects to the number 6 terminal on the network side. These telephone line connections utilize standard telephone line terminals. For example, the SNID 21 may include RJ-11 jacks as the network side terminals 1 and 6. The primary and auxiliary telephone circuits $19_P$ and $19_A$ then are terminated in RJ-11 plugs for connection to the SNID 21 through the RJ-11 jacks. If the customer subscribes to broadband services, the broadband drop wiring $19_V$ preferably connects to the number 5 network side terminal. If the broadband wiring $19_V$ uses twisted wire pairs, then the network side terminal comprises a standard telephone type connector. If the wiring $19_A$ comprises coaxial cable, the network side terminal 5 may comprise an F-connector.

The customer premises telephone wiring 23 preferably connects to the number 1 terminal on the customer side, and the broadband customer premises wiring $23_V$ (if any) preferably connects to the number 5 terminal or the customer side. The terminals or connectors on the customer side logically form a customer side coupler. The customer premises telephone wiring 23 typically comprises a twisted wire pair, and the connection thereof to the SNID uses standard telephone type connectors. At least terminal 1 on the customer side preferably comprises an RJ-11 jack. An RJ-11 plug connected to the customer premises wiring 23 is inserted in the RJ-11 jack to connect the customer premises telephone wiring 23 to the SNID 21. If the broadband customer premises wiring $23_V$ utilizes a twisted wire pair, then the customer side terminal 5 may comprise a telephone type connector. If the broadband customer premises wiring $23_V$ utilizes coaxial cable, then customer side terminal 5 may comprise an F-connector. In the presently preferred embodiment, all wiring utilizes twisted wire pairs and all connectors on the SNID are standard telephone type twisted wire pair connectors.

The controller 213 preferably is implemented as a programmable microcomputer, i.e. a microprocessor with associated programming memory and data storage memory. The switch 211 provides a coupling of one or more of the drop wiring circuits 19 to the controller 213, to permit two-way signaling communication between the controller 213 and other elements of the network, typically the OCC 27 and/or the switching signal source 140. In response to signaling messages received via one or more of the drop wiring circuits, the controller 213 activates the switch 211 to connect specified drop wiring circuits 19 to the customer premises wiring.

The LDU 215 is essentially similar to the LDU 177 discussed above, except that the LDU 215 tests only the circuits actually present and active in the one customer's premises coupled to the one SNID 21. In response to instructions from the controller 213, the LDU 215 conducts electrical measurements on identified ones of the circuits and supplies measurement results to the controller 213. The controller 213 in turn transmits measurement data upstream as signaling messages on one of the drop circuits, and the SONU 17 and HDT 130 route those messages to the OCC 27. The OCC 27 will provide instructions to the controller 213 through downstream signaling messages as to which circuits the LDU should test and what measurements to conduct on each circuit. The switch 211 provides an actual wire connection between its various ports. The test measurements by the LDU 215 therefore represent conditions on the customer premises wiring 23, $23_V$ and on the various drop cable circuits 19 that the switch currently connects to the customer premises wiring.

Assume now that the customer currently subscribes to one telephone line and to broadband services. In normal operation, the controller 213 would maintain the switch 211 in a state connecting the primary twisted wire pair drop wiring circuit $19_P$ to the customer premises telephone wiring 23 and connecting the broadband drop wiring circuit $19_V$ to the broadband customer premises telephone wiring $23_V$. Expressed another way, the switch provides a connection of network side terminal 1 to customer side terminal 1 and a connection of network side terminal 5 to customer side terminal 5. However, the controller 213 can activate the switch 211 to provide other connections.

For example, if the primary telephone circuit $19_P$ fails or the OCC 27 predicts that the primary telephone circuit $19_P$ will soon fail, the OCC 27 instructs the SONU 17 to activate the auxiliary circuit $19_A$ and deactivate the primary circuit $19_P$ (as discussed above). The OCC 27 also instructs the HDT 130 to route an appropriate switching signal from source 140 through assigned channel slots on the active fiber pair 15 and the auxiliary circuit $19_A$ to the SNID 21. In the SNID, the controller 213 detects the tones representing the switching signal and activates the switch 211. In response, the switch 211 connects the customer premises wiring 23 to the auxiliary drop cable wiring circuit $19_A$, in place of the previous connection to the primary drop cable wiring circuit $19_P$. Expressed another way, the switch 211 now provides a connection between network side terminal 6 and customer side terminal 1.

Typically, the network operating company will repair the primary circuit $19_P$ at some later date, that is convenient. The OCC 27 can then provide the appropriate instructions to the SONU 17 and the SNID 21 to restore service via the primary drop cable wiring circuit $19_P$ and return the auxiliary drop cable wiring circuit $19_A$ to auxiliary status.

As another example, if the customer orders a second telephone line, the OCC 27 instructs the SONU 17 to activate the auxiliary circuit $19_A$ as a second line (as discussed above) and instructs the HDT 130 to route an appropriate switching signal from source 140 through assigned channel slots on the active fiber pair 15 and the auxiliary circuit $19_A$ to the SNID 21. In the SNID, the controller 213 detects the tones representing the switching signal and activates the switch 211. In response, the switch 211 connects the auxiliary drop cable wiring circuit $19_A$ to customer side terminal 2. The customer can connect new customer premises wiring (shown as a dot-dash line in FIG. 3) to customer side terminal 2 and immediately receive telephone service via the additional line. The switch 211 continues to connect the primary drop cable wiring circuit $19_P$ to the existing customer premises telephone wiring 23.

For the second line service, the network operating company can later install an additional line and restore the auxiliary capacity. More specifically, at its convenience, the operating company dispatches a technician. The technician connects a new line circuit from the SONU 17 to a free network side terminal, e.g. network side terminal 2, of the SNID 21. The technician informs the OCC 27 that the new connection is complete. In response, the OCC 27 instructs the SONU 17 to transfer connection of the line card providing the second line service over to the new drop line, effectively deactivating the auxiliary circuit $19_A$. The OCC 27 also instructs the HDT 130 to route an appropriate switching signal from source 140 through the SONU to the controller 213 in the SNID 21. In the SNID, the controller 213 detects the tones representing the switching signal and activates the switch 211. In response, the switch 211 disconnects the second customer premises telephone wiring from the auxiliary drop cable wiring circuit $19_A$, and connects that customer premises wiring on customer side terminal 2 to the network side terminal 2 and the new drop cable circuit. As such, the auxiliary drop cable wiring circuit $19_A$ returns to its inactive or spare status and again is available for future use.

The above examples assumed that the subscriber initially had only one telephone line. If the customer already has additional line service connected to one or more of the network side connectors 2, 3, and 4, then the SONU 17 and the switch 211 can be activated in a similar manner to connect the auxiliary drop circuit $19_A$ to any one of the customer side connectors 2, 3, or 4 to activate or restore service. Also, if the broadband services use twisted wire pair links, or the auxiliary drop circuit $19_A$ and the broadband customer premises wiring $23_V$ both comprise coaxial cables, then the SONU 17 and the switch 211 could selectively connect the auxiliary circuit $19_A$ to the broadband customer premises wiring $23_V$, e.g. to restore broadband services.

Figure 4:
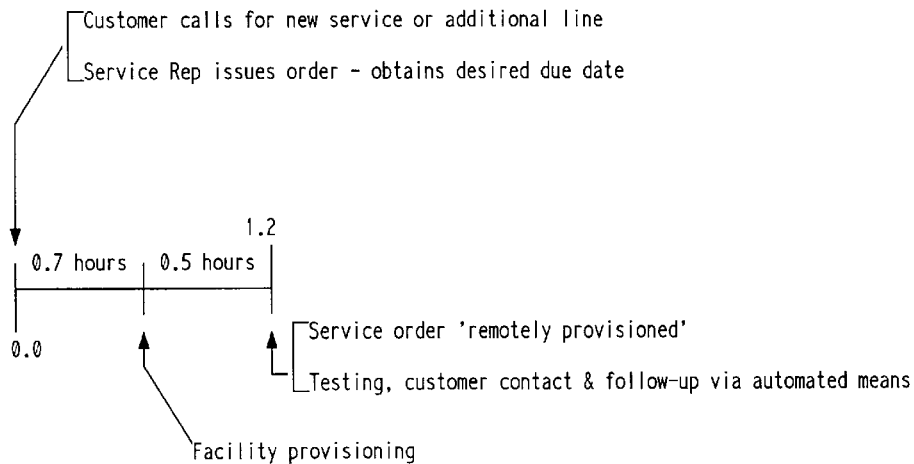
FIG. 4 is a timeline showing the process and averages times for provisioning and installation for a new service, in a network in accord with the present invention.

FIG. 4 shows the timeline for the process of the automatic provisioning and installation for a new service, such as the above described second telephone line, in accord with the present invention. Time values shown in FIG. 4 are projected average values, and actual processing time may vary.

The process begins when a subscriber calls in to the business office of the telephone operating company. The subscriber provides relevant personal information to a service representative, and the subscriber and the service representative negotiate the details of the desired new service. In the present example, the service representative takes the order for the additional telephone line.

When the interaction with the customer is complete, the service representative issues an order for the desired service (new line) and obtains a due date for expected completion of the required provisioning and installation work. On average, the interaction between the subscriber and the representative and the issuance of the service order take 0.7 hours. The service representative relays the service order to the OCC 27, and the OCC 27 automatically provisions and activates the various network components, including the HDT 130, the SONU 17 and the SNID 21, as discussed in detail above. Effectively, the new line is activated as an automatic remote provisioning function responsive to the service order, without requiring dispatch of any technician to install or connect the additional line. The OCC 17 may also order various line tests by the LDU 177 and/or the LDU 215. After the service activation, the business office contacts the customer as a follow-up, e.g. to determine the customer's satisfaction. The follow-up contact may utilize an automated announcement system, such as the Service Assurance Voice System (SAVS) disclosed in commonly assigned U.S. Pat. No. 5,428,679 to French, to provide notice of the completed activation of the new service and offer the subscriber an opportunity to obtain additional information relating to available network services. The remote provisioning, testing and follow-up may take an additional half hour.

Figure 6:
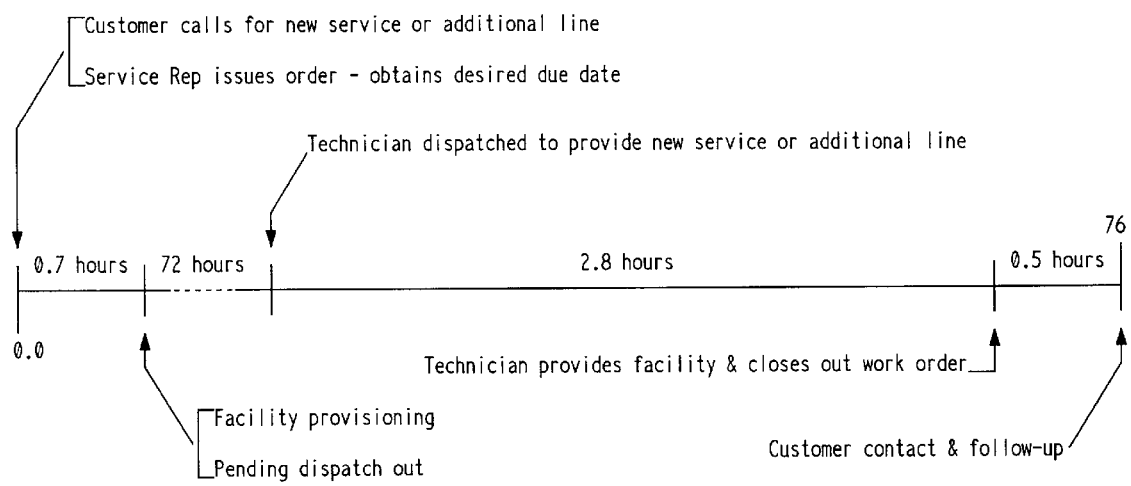
FIG. 6 is a timeline showing the process and averages times for provisioning and installation for a new service, in an existing telephone network.

As shown by FIG. 4 and the above discussion, an average activation of an additional line takes only 1.2. hours from the time that the subscriber first calls in to order the new line, using the auxiliary circuits, the switching functionality of the SONU and the SNID and automatic procedures of the present invention. This process time compares quite favorably to the 76 hour processing time currently experienced by customers ordering new line telephone services, as discussed above relative to FIG. 6. Similar process time improvements arise when providing upgrades of service on a particular line, e.g. from POTS to ISDN and from POTS or ISDN to broadband.

Figure 5:
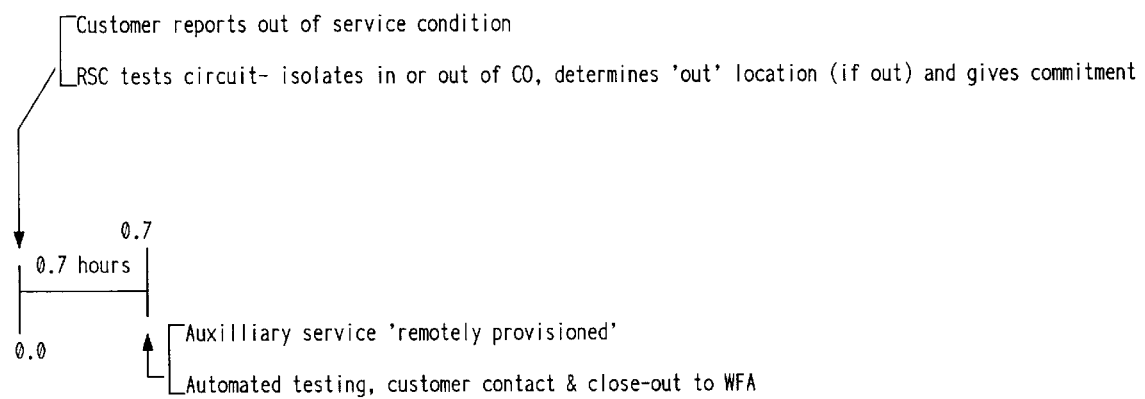
FIG. 5 is a timeline showing the process and averages times for restoration of an interrupted service, in a network in accord with the present invention.

The present invention similarly reduces time delays in restoring service through inoperative telephone line installations. FIG. 5 shows the timeline for service restoration using the present invention. Again, time values shown in the drawing are exemplary average values, and actual service order processing times may vary.

The process begins when a subscriber calls in to the business office of the telephone operating company to request repair for an out of service POTS, ISDN or broadband line. Assume for this example interruption of service on a POTS line. The subscriber provides relevant personal information to a service representative to identify the subscriber and the out of service line. The OCC 27 orders automated tests on the facilities allocated to the subscriber, e.g. by using the LDU 177. From these tests, it can be determined whether the fault is in the network or is somewhere in the outside plant, between the serving central office and the subscriber's telephone station equipment. For purposes of the present example, assume that these tests indicate a failure in the subscriber's primary drop cable wiring circuit $19_P$. The operator at the telephone company office then determines the approximate time to complete the repair and gives the subscriber that time as a 'commitment'.

When the interaction with the customer is complete, the service representative issues a trouble report, and that trouble report goes to the OCC 27. In response, the OCC 27 activates the SONU 17 and the subscriber's SNID 21 to automatically switch the subscriber's telephone service over to the auxiliary drop cable wiring circuit $19_A$, as discussed in detail above. Effectively, the service is switched to the auxiliary line circuit as an automatic remote provisioning function responsive to the trouble report, without requiring dispatch of any technician to restore the out of service line. The OCC 17 also orders various line tests by the LDU 177 and/or the LDU 215. During the service restoration, the business office often will remain in contact with the customer; and when service is restored, the service representative can ask the customer to call back using the telephone service, i.e. as a follow-up showing the subscriber that service actually has been restored. Again the confirmation and/or follow-up call could utilize an automated system, such as disclosed in the French Patent.

Figure 7:
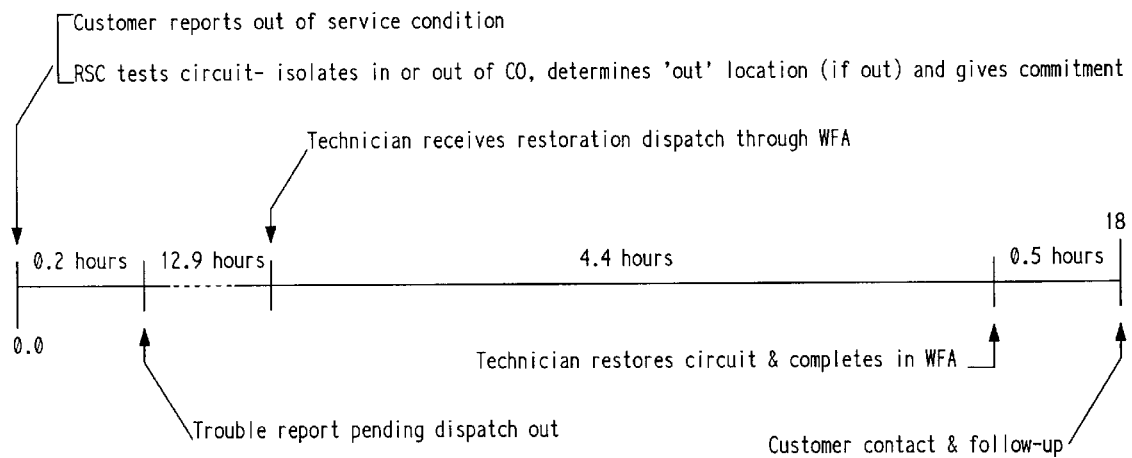
FIG. 7 is a timeline showing the process and averages times for restoration of an interrupted service, in an existing telephone network.

An average restoration of this type takes approximately 0.7 hours. This process time compares quite favorably to the 18 hour process time currently experienced by customers reporting loss of telephone service due to an inoperative drop cable, as discussed above relative to FIG. 7.

The above discussion generally has concentrated on upgrades of service and restoration of services in response to requests from customers (reactive). As noted, the present invention may also transfer service from a primary fiber or drop cable circuit to the corresponding auxiliary facilities in response to predicted failures. Such transfers of service provide a proactive network maintenance capability to avoid actual failures that would otherwise effect services provided by the network to the customers. Principles of such prediction and proactive maintenance are discussed in detail in commonly assigned U.S. patent application Ser. No. 08/506, 655, filed Jul. 25, 1995 entitled "System for Proactively Maintaining Telephone Network Facilities in a Public Switched Telephone Network" (attorney docket no. 680-151), the disclosure of which is incorporated herein in its entirety by reference.

The present invention may be subject to a variety of modifications. For example, other types of HDTs and ONUs may be adapted in accord with the principles of the present invention, such as the remote terminals and the ONUs in the above discussed Czerwiec et al. Patent. Examples of full service networks providing an array of digitized broadband services as well as packet data services and telephone services, using HDTs and ONU adaptable to the present invention also are disclosed in U.S. patent application Ser. No. 08/250,792 filed May 27, 1995 entitled "Full Service Network" (attorney docket no. 680-080) and U.S. patent application Ser. No. 08/380,758 filed Jan. 31, 1995 entitled "VPI/VCI Administration" (attorney docket no. 680-123).

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A switchable optical network unit comprising:
   an optical/electrical interface for coupling to at least one optical fiber;
   a multiplexer/demultiplexer electrically coupled to the optical/electrical interface;
   a plurality of line cards, each line card for providing a two-way communications interface between the multiplexer/demultiplexer and one customer drop line port;
   a plurality of terminals for connection to a plurality of customer drop lines;
   a switch coupled between the customer drop line ports of the line cards and the terminals, for providing selective connections between the customer drop line ports of the line cards and the terminals; and
   a controller for automatically activating the switch.

2. A switchable optical network unit as in claim 1, wherein the plurality of line cards comprises:
   a first group of line cards providing a first type of line sided service; and
   a second group of line cards providing a second type of line sided service different from the first type of line sided service.

3. A switchable optical network unit as in claim 2, wherein:
   the first group of line cards provide an analog telephone service; and
   the second group of line cards provide an integrated services digital network (ISDN) type service.

4. A switchable optical network unit as in claim 3, wherein the plurality of line cards further comprises a third group of line cards providing a broadband service.

5. A switchable optical network unit as in claim 2, wherein:
   the first group of line cards provide a telephone service; and
   the second group of line cards provide a broadband service.

6. A switchable optical network unit as in claim 1, wherein the optical/electrical interface comprises an interface for coupling to upstream and downstream optical fibers.

7. A switchable optical network unit as in claim 1, wherein the optical/electrical interface comprises:
   a primary optical/electrical interface for coupling to a first optical fiber digital communication link; and
   an auxiliary optical/electrical interface for coupling to a second optical fiber digital communication link.

8. A switchable optical network unit as in claim 7, wherein:
   the primary optical/electrical interface comprises a coupling to a first pair of optical fibers; and
   the auxiliary optical/electrical interface comprises a coupling to a second pair of optical fibers.

9. A switchable optical network unit as in claim 1, wherein the multiplexer/demultiplexer comprises a time slot interchanger.

10. A switchable optical network unit as in claim 1, wherein the terminals provide couplings for twisted wire pair drop lines.

11. A switchable optical network unit as in claim 1, further comprising a diagnostic device for conducting test measurements on drop lines coupled to the terminals and communicating test measurement results via the optical/electrical interface.

12. A switchable optical network unit as in claim 1, wherein:
   the controller receives control signals via the optical/electrical interface; and
   the controller activates the switch in response to the received control signals.

13. A switchable optical network unit comprising:
   an optical/electrical interface for coupling to at least one optical fiber;
   a multiplexer/demultiplexer electrically coupled to the optical/electrical interface;
   a line card for providing a two-way communications interface between the multiplexer/demultiplexer and one customer drop line port;
   a first customer drop cable wiring terminal for connection to a primary drop cable wiring circuit extending to a customer premise;
   a second customer drop cable wiring terminal for connection to an auxiliary drop cable wiring circuit extending to the customer premise;
   a switch coupled between the customer drop line port of the line card and the terminals, for providing selective connections between the customer drop line port of the line card and the terminals; and
   a controller for automatically activating the switch.

14. A switchable optical network unit as in claim 13, wherein:
   the controller receives control signals via the optical/electrical interface; and
   the controller activates the switch in response to the received control signals.

15. A switchable optical network unit as in claim 13, wherein the line card provides an analog telephone service.

16. A switchable optical network unit as in claim 13, wherein the line card provides an integrated services digital network (ISDN) type service.

17. A switchable optical network unit as in claim 13, wherein the line card provides a broadband service.

18. A switchable optical network unit as in claim 13, further comprising a diagnostic device for conducting test measurements on the circuits coupled to the terminals and communicating test measurement results via the optical/electrical interface.

19. A switchable optical network unit as in claim 13, wherein the terminals provide couplings for twisted wire pair circuits.

20. A switchable optical network unit comprising:
   an optical/electrical interface for coupling to at least one optical fiber;
   a multiplexer/demultiplexer electrically coupled to the optical/electrical interface;
   a first line card for providing a two-way communications interface between the multiplexer/demultiplexer and one customer drop line port in accord with a first service protocol;
   a second line card for providing a two-way communications interface between the multiplexer/demultiplexer and one customer drop line port in accord with a second service protocol that is different from the first service protocol;

a customer drop cable wiring terminal for connection to a drop line extending to a customer premise;

a switch coupled between the customer drop line ports of the first and second line cards and the terminal, for providing selective connections between the customer drop line ports of the first and second line cards and the terminal; and a controller for automatically activating the switch.

21. A switchable optical network unit as in claim 20, wherein:

the controller receives control signals via the optical/electrical interface; and the controller activates the switch in response to the received control signals.

22. A switchable optical network unit as in claim 20, wherein the first line card provides an analog telephone service.

23. A switchable optical network unit as in claim 22, wherein the second line card provides an integrated services digital network (ISDN) type service.

24. A switchable optical network unit as in claim 22, wherein the second line card provides a broadband service.

25. A switchable optical network unit as in claim 20, wherein the first line card provides an integrated services digital network (ISDN) type service.

26. A switchable optical network unit as in claim 25, wherein the second line card provides a broadband service.

27. A switchable optical network unit as in claim 20, wherein the terminal provides a coupling for a twisted wire pair drop line.

28. In an optical network unit providing a two-way interface between a multi-channel fiber optic communication link to a central office and a plurality of drop cables extending to a plurality of customer premises, a method comprising the steps of:

coupling communication signals for one customer premise to and from an assigned channel on the fiber optic communication link through a switch in a first state from and to a first circuit in a drop cable extending to the one customer premise, wherein said switch is an element of the optical network unit;

in response to a control signal, automatically activating the switch to a second state; and coupling communication signals for the one customer premise to and from the assigned channel on the fiber optic communication link through the switch in the second state from and to a second circuit in the drop cable extending to the one customer premise.

29. A method as in claim 28, wherein each coupling step comprises processing communication signals for the one customer premises through a line card assigned to provide a predetermined type of service for the one customer premise.

30. A method as in claim 29, wherein the predetermined type of service comprises analog telephone service.

31. A method as in claim 29, wherein the predetermined type of service comprises an integrated services digital network (ISDN) service.

32. A method as in claim 29, wherein the predetermined type of service comprises a broadband service.

33. A method as in claim 28, wherein the step of automatically activating the switch comprises receiving a switching control signal via the fiber optic communication link.

34. In an optical network unit providing a two-way interface between a multi-channel fiber optic communication link to a central office and a plurality of drop cables extending to a plurality of customer premises, a method comprising the steps of:

coupling communication signals for one customer premise to and from an assigned channel on the fiber optic communication link through a switch in a first state from and to a first circuit in a drop cable extending to the one customer premise, wherein said switch is an element of the optical network unit;

in response to a control signal, automatically activating the switch to a second state;

coupling communication signals for the one customer premise to and from the assigned channel on the fiber optic communication link through the switch in the second state from and to a second circuit in the drop cable extending to the one customer premise;

transmitting another control signal to a network interface device at the one customer premise; and in response to said another control signal, disconnecting customer premises wiring from the first circuit in the drop cable extending to the one customer premise, and connecting the customer premises wiring to the second circuit in the drop cable extending to the one customer premise.

35. In an optical network unit providing a two-way interface between a multi-channel fiber optic communication link to a central office and a plurality of drop cables extending to a plurality of customer premises, said optical network unit including a plurality of line cards for providing a plurality of different types of services and a switch for selectively coupling line ports of the line cards to circuits in the drop cables, a method comprising the steps of:

coupling communication signals relating to a first type of service for one customer premise to and from an assigned channel on the fiber optic communication link to and from a first line card providing a first type of service;

routing signals relating to the first type of service to and from the line port of the first line card through the switch in a first state from and to a circuit in a drop cable extending to the one customer premise;

in response to a control signal, automatically activating the switch to a second state; and coupling communication signals relating to a second type of service for the one customer premise to and from an assigned channel on the fiber optic communication link to and from a second line card providing a second type of service;

routing signals relating to the second type of service to and from the line port of the second line card through the switch in the second state from and to the circuit in the drop cable extending to the one customer premise.

36. A method as in claim 35, wherein:

the first type of service comprises analog telephone service; and the second type of service comprises an integrated services digital network (ISDN) service.

37. A method as in claim 35, wherein:

the first type of service comprises analog telephone service; and the second type of service comprises a broadband service.

38. A method as in claim 35, wherein:

the first type of service comprises an integrated services digital network (ISDN) service; and the second type of service comprises a broadband service.

39. A method as in claim 35, wherein the step of automatically activating the switch comprises receiving a switching control signal via the fiber optic communication link.

40. In an optical network unit providing a two-way interface between a multi-channel fiber optic communication link to a central office and a plurality of drop cables extending to a plurality of customer premises, said optical network unit including a plurality of line cards for providing service to line circuits and a switch for selectively coupling line ports of the line cards to line circuits in the drop cables, a method comprising the steps of:

provA ID ING a primary line circuit and an auxiliary line circuit in a drop cable extending from the optical network unit to one customer premise;

coupling first communication signals for the one customer premise to and from a first assigned channel on the fiber optic communication link to a first line card assigned to provide a first service to the one customer premise;

routing signals relating to the first service to and from the line port of the first line card through the switch in a first state from and to the primary line circuit in the drop cable extending to the one customer premise;

in response to a control signal, automatically activating the switch to a second state and automatically assigning a second line card to provide a second service to the one customer premise;

coupling second communication signals for the one customer premise to and from a second assigned channel on the fiber optic communication link to the second line card;

routing signals relating to the second service to and from the line port of the second line card through the switch in the second state from and to the auxiliary line circuit in the drop cable extending to the one customer premise.

41. A method as in claim 40, wherein the primary line circuit and the auxiliary line circuit comprise telephone line circuits.

42. A method as in claim 40, wherein at least one of the first and second services comprises analog telephone service.

43. A method as in claim 40, wherein at least one of the first and second services comprises an integrated services digital network (ISDN) service.

44. A method as in claim 40, wherein at least one of the first and second services comprises a broadband service.

45. A method as in claim 40, wherein the first and second services comprise telephone services.

46. A method as in claim 40, wherein the step of automatically activating the switch comprises receiving a switching control signal via the fiber optic communication link.

47. A switchable optical network unit comprising:

an optical/electrical interface for coupling to at least one optical fiber of a communication network;

a multiplexer/demultiplexer electrically coupled to the optical/electrical interface;

a plurality of line cards, each line card for providing a two-way communications interface between the multiplexer/demultiplexer and one customer line port;

a plurality of terminals for electrical connection to a plurality of wire lines to customer premises;

a switch coupled between the customer line ports of the line cards and the terminals, for providing selective electrical connections between the customer line ports of the line cards and the terminals; and a controller for receiving control signals via the optical/electrical interface and the multiplexer/demultiplexer and for automatically activating the switch in response to the received control signals.

48. A switchable optical network unit as in claim 47, wherein the terminals provide electrical connections for twisted pair telephone lines.

49. A switchable optical network unit as in claim 47, further comprising a diagnostic device for conducting test measurements on lines coupled to the terminals, wherein: the controller activates the diagnostic device in response to control signals from the communication network received via the optical/electrical interface and the multiplexer/demultiplexer, and the controller communicates test measurement results from the diagnostic device to the communication network via the optical/electrical interface.

50. A switchable optical network unit as in claim 47, wherein the optical/electrical interface comprises:

a primary optical/electrical interface for coupling to a first optical fiber digital communication link; and an auxiliary optical/electrical interface for coupling to a second optical fiber digital communication link.

51. A switchable optical network unit comprising:

an optical/electrical interface for coupling to at least one optical fiber of a communication network;

a multiplexer/demultiplexer electrically coupled to the optical/electrical interface;

a first line card for providing a two-way communications interface between the multiplexer/demultiplexer and a first customer line port in accord with a first service protocol;

a second line card for providing a two-way communications interface between the multiplexer/demultiplexer and a second customer line port in accord with a second service protocol that is different from the first service protocol;

a customer drop cable wiring terminal for electrical connection to a wire line extending to a customer premise;

a switch coupled between the customer line ports of the first and second line cards and the terminal, for providing selective electrical connections between the customer line ports of the first and second line cards and the terminal; and a controller for receiving control signals via the optical/electrical interface and automatically activating the switch in response to the received control signals.

52. A switchable optical network unit as in claim 51, wherein the terminal provides electrical connection for a twisted pair telephone line.

53. A switchable optical network unit as in claim 51, further comprising a diagnostic device for conducting test measurements on a drop line coupled to the terminal, wherein: the controller activates the diagnostic device in response to control signals received from the communication network via the optical/electrical interface and the multiplexer/demultiplexer and the controller communicates test measurement results from the diagnostic device to the communication network via the optical/electrical interface.

54. A switchable optical network unit as in claim 51, wherein the optical/electrical interface comprises:

a primary optical/electrical interface for coupling to a first optical fiber digital communication link; and an auxiliary optical/electrical interface for coupling to a second optical fiber digital communication link.

* * * * *